Dec. 17, 1968  J. R. F. McNAIR  3,416,934
TREATMENT OF MOULD SURFACES
Filed June 29, 1965

INVENTOR.
JAMES RUSSELL FARRELL McNAIR

BY Kurt Kelman
AGENT

United States Patent Office 3,416,934
Patented Dec. 17, 1968

3,416,934
TREATMENT OF MOULD SURFACES
James Russell Farrell McNair, Solihull, England, assignor to Abrasive Developments Limited, Solihull, England, a British company
Filed June 29, 1965, Ser. No. 467,854
Claims priority, application Great Britain, July 2, 1964, 27,283/64
5 Claims. (Cl. 106—38.24)

ABSTRACT OF THE DISCLOSURE

The specification discloses a method of simultaneously cleaning a mould surface and applying a mould release agent to the surface, the method is particularly applicable to the treatment of surfaces of moulds used for moulding rubber and synthetic resinous materials. The method comprises projecting a mixture of a mould release agent, a carrier liquid and solid particles, which are capable of effecting a cleaning action on the surface when projected thereat, at the surface so that the particles effect such cleaning action and bring the agent into intimate contact with the surface.

---

Figure 1:
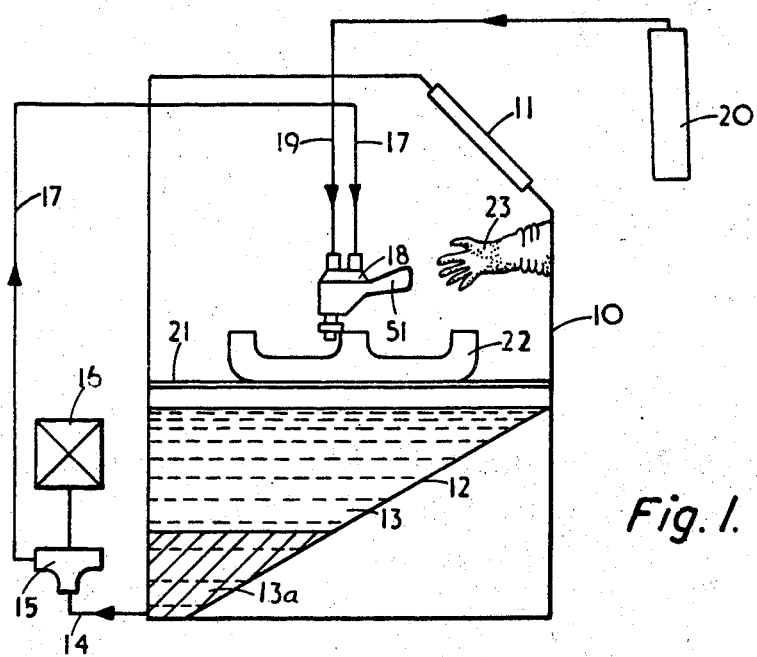

The invention is particularly useful in connection with the process of moulding rubber tires for motor vehicles. Such moulds are hinged and are opened after each cure to remove the tire. It is necessary to furnish the mould with a mould release agent to prevent the rubber sticking to the mould surface and to facilitate the extraction of the moulded tire. As at present practised, the mould surface is sprayed with an atomised mould release agent after every second cure. The mould release agent is entrained in a stream of compressed air and is directed as an atomised jet at the mould surface.

After a number of cures, the circumstances vary but usually between about 1500 and 2000, the mould begins to produce tires which have matt side walls and these are rejected by the inspectorate and the mould is taken out of the machine and is cleaned. At the moment, these moulds are cleaned by a stream of abrasive.

It will be seen that between abrasive cleanings, the mould will be subjected to between 700 and 1000 sprays of mould release agent and there will be a tendency for the mould release agent to build up on parts of the mould surface. Moreover, a considerable amount of mould release agent is used. Furthermore, the spraying of the mould with the mould release agent takes up an appreciable part of the working time.

These problems exist particularly in connection with the moulding of tires but similar problems also apply to the moulding of articles of synthetic resinous material, for example the moulding of plastic turbine blades. These moulds are of complicated shape and are normally cleaned by hand which has to take place after about every fifteen or so moulding operations.

It is an object of the present invention to provide a method of treating a mould surface so as to cut down the requirement for spraying the mould surface with a mould release agent between its periodic cleanings.

It is another object of the invention to provide a mixture for treating a mould surface and which is suitable for being projected against the surface.

According to one aspect of the invention there is provided a method of simultaneously cleaning a mould surface and applying a mould release agent to the surface comprising projecting a mixture of the agent, a carrier liquid and solid particles, which are capable of effecting a cleaning action on the surface when projected thereat, at the surface so that the particles effect such cleaning action and bring the agent into intimate contact with the surface.

It is found that by applying the mould release agent to the mould surface at the same time that it is cleaned with solid particles, the number of times which mould release agent has to be applied to the mould surface between such cleanings is considerably reduced with a saving in the use of the mould release agent and also a saving of time. Taking the example of tire moulding mentioned above, it has been found, surprisingly, that it is only necessary to spray the mould surface with a mould release agent on an average of about 1% of the number of times that it becomes necessary without using the invention. Thus with the figures mentioned above of between 1500 and 2000 cures between cleaning when the invention is used it would be necessary only to spray the mould between 15 and 20 times. This does not mean necessarily that the mould will have to be sprayed after every 100 cures but it has been found upon an average that the number of times which the mould has to be sprayed is cut down in the ratio mentioned.

Preferably, the carrier liquid is water since this is the cheapest and most readily available and is satisfactory for the purpose. The mould release agent may conveniently be a di-methyl silicone. The particles may include glass beads, for example, spherical beads made of soda glass. Alternatively, or in addition, the particles may include particles of Bauxilite i.e. fused aluminium oxide.

Preferably, the particles are of a size such that they will go through a 250 micron sieve. Preferably also, at least half of the particles will be retained on a 100 micron sieve and will pass through a 200 micron sieve.

The mould release agent may be present as a coating on the particles. Where the mould release agent is present as a coating, the weight of the coating may be between 1 and 3% of the weight of the bead before coating.

Alternatively, or in addition, the mould release agent may be present in the carrier. In this case the mould release agent may be between ⅙% and ½% of the carrier liquid by weight. The mixture can be projected at the mould surface either by liquid pressure or by a combination of compressed air and liquid pressure which is preferred. Thus the liquid containing the particles and the mould release agent may be pumped to a blasting gun and may be mixed in the chamber with compressed air and the atomised mixture may then be directed at the mould surface.

According to another aspect of the invention we provide mixtures suitable for carrying out the method of the first aspect of the invention.

Figure 2:
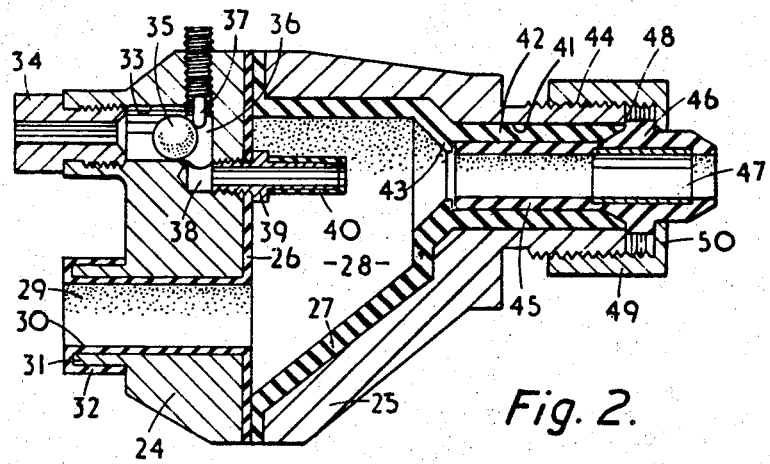

The invention will now be described in detail with reference to the accompanying diagrammatic drawings in which:

FIGURE 1 is a section through a treating cabinet and
FIGURE 2 is a section through a blasting gun shown in FIGURE 1.

Referring first to FIGURE 1, this comprises a cabinet indicated generally at 10 having an observation window 11. The bottom 12 of the cabinet slopes towards the rear of the cabinet to provide a sump 13. Leading from the bottom of the sump is a pipe 14 which leads to a pump 15 driven by a motor 16. The pump may be of the type described and claimed in British specification Number 840,671. Such pumps being capable of pumping a mixture of liquid and solid particles.

From the pump 15 a pipe 17 takes the output of the pump to a blasting gun indicated generally at 18. Also fed to the gun through a pipe 19 is compressed air from a compressed air supply indicated at 20.

The cabinet is provided with a supporting grille 21 on which a mould part 22 may be supported. The gun 18 may be manipulated by an operator protected by gloves 23 built into the side of the cabinet.

The cabinet is charged with a mixture of water, a mould release agent and solid particles in the form of glass beads. Thus the water can contain an amount of glass beads equal to 2 lbs. per gallon. The beads themselves will all be of a size to be able to pass through a 250 micron sieve and will be arranged so that half the beads will remain on a 100 micron sieve and will pass through a 200 micron sieve. The particles will sink to the bottom of the sump 13 as indicated at 13a and will be drawn by the pump 15 and delivered to the gun 18. The pump 15 will be arranged to deliver the mixture to the gun 18 at a pressure of 50 p.s.i. gauge at a rate of 13 gallons per minute. Air will be supplied to the gun at a pressure of 100 p.s.i.

Referring now to FIGURE 2, this shows the gun in section. The gun comprises two parts 24 and 25 which are provided with rubber linings 26 and 27 respectively and which are held together by screws (not shown). Defined between the parts 24 and 25 is a chamber 28. Leading into the chamber is a first passage 29 for the mixture of particles and water, the passage having a rubber lining 30 which is turned outwardly over a rim 31 to provide an outer rubber surface 32. The part 24 is also formed with a passage 33 into which is threaded a nipple 34 for connection to the air line 19. In the passage 33 there is mounted a rubber ball 35 which is restrained from entering a transverse passage 36 by means of a pin 37. The transverse passage 36 leads into a further passage 38 in which is mounted an air nozzle 39 which has a rubber covering 40.

Leading out from the chamber 28 is an outlet passage 41 which has a rubber lining 42, the lining providing a locating flange 43 at its inner end. The part 25 is externally threaded at 44 on a part containing the outlet passage 41.

Fitted into the outlet passage 41 is a rubber nozzle piece 45 whose inner end abuts the flange 43. The nozzle piece 45 has a flange 46 and a carbide insert 47. The flange 46 is forced against the end 48 of the housing part 25 by means of a threaded collar 49 having an inturned flange 50.

The operation of the gun is as follows, the mixture of particles and liquid enters through the passage 29 into the chamber 28. It is then entrained by the air passing through the nozzle 39 and is forced to the right in FIGURE 2 and flows out through the nozzle piece 45. The gun is provided with a handle 51 whereby it may be gripped by the operator.

The mould part 22 thus has projected against its mould surface a mixture of water, glass balls and a mould release agent. It has been found surprisingly, as mentioned above, that treatment in this manner has a result that the number of applications of mould release agent between each cleaning step can be reduced to approximately a hundredth of what was required before. It is believed that this is because the mould release agent is forced into the surface interstices of the mould by the mechanical action of the glass balls on the mould surface so that the mould release agent remains keyed to the mould surface and does not tend to be worn off by a few moulding steps. It is not desired to be bound by this explanation but certainly there is a surprising result from employing the invention in that the number of intermediate applications of mould release agent can be considerably cut down thus saving valuable operators time and also controlling the amount of mould release agent which is used.

It is also possible to include in the mixture a rust inhibitor such as sodium nitrite. Thus, after a mould part has been cleaned it is often returned to store to await its next period of service and it is very desirable that the surface be rust inhibited during its period of storage. It is very convenient to be able to apply the rust inhibitor with the mould release agent and at the same time as the mould surface is otherwise treated. The amount of rust inhibitor may be, for example, three times the amount of mould release agent.

When the mixture has impinged on the mould surface it falls down to the sump 13 and is again collected by the pump 15 and is recirculated.

In an alternative arrangement, the mould release agent may be applied as a coating to the solid particles, for example, the glass balls. This coating may be applied by passing the uncoated glass beads into a chamber at a temperature of about 3000° C. and passing in also a mould release agent, such as a di-methyl silicone, in the form of a gas which condenses on the surfaces of the beads. Preferably, the weight of a coating may be between 1 and 3% of the weight of an uncoated bead, i.e. the weight of the coating in a mass of coated beads may be between 1 and 3% of the weight of the beads before coating.

When using coated beads, the carrier can also include a mould release agent if desired or the desired treatment of the mould surface may be obtained solely by the coating on the particles. When using coated particles the same pressures and quantities will be used as mentioned above.

If desired, the particles can be protected on to the surface purely by the action of a stream of liquid, i.e. without the addition of any compressed air. Generally speaking, this will have a rather less severe action on the mould surface.

Where the mould release agent is added to the liquid carrier it is preferred that a concentrated emulsion of the liquid carrier and the mould release agent be made up which is further diluted in the cabinet. Thus, for example, a concentrated emulsion of water and the mould release agent may be made up containing approximately 35% of the mould release agent. The concentrated emulsion may be made up by forcing the two liquids together through a homogeniser to break down the silicone so that it becomes dispersed in the water carrier. This concentrated emulsion may then easily be mixed with the greater quantity of water in the cabinet.

It will be appreciated that if desired, the mould release agent may be present both as a coating on the particles and also dispersed in the carrier. For many applications, it is desired to use glass balls but other abrasive material may be used, for example, as Bauxilite which is a fused aluminium oxide. Moreover, although a di-methyl silicone has been mentioned as the preferred mould release agent it would also be possible to use other mould release agents such, for example, as calcium, aluminium or zinc stearate. If such stearates were used then it would be desirable to use them in a concentration of between ⅛% and 1% by weight of the carrier liquid.

It will be seen that the invention provides a simple method of both cleaning a mould surface and simultaneously providing it with a coating of a mould release agent which has surprising properties in that it lasts considerably longer than if the mould release agent is merely sprayed by compressed air at the mould surface.

Moreover, the invention results in economies since the amount of mould release agent used is cut down and the time spent in spraying the mould surface with mould release agent during a curing run is also cut down.

What I claim then is:

1. In a method of simultaneously cleaning a mould surface and applying a mould release agent thereto, the steps of forcibly projecting at the mould surface a mixture of a carrier liquid, solid particles comprising glass beads, and a release agent selected from the group consisting of calcium, aluminum and zinc stearates and di-methyl silicone, wherein the solid particles are present in an amount of approximately 2 lbs. per gallon of the carrier liquid and wherein the release agent is present in an amount of between ⅛% and ½% of the carrier liquid by weight;

and utilizing the solid particles in the mixture to simultaneously clean the mould surface and to bring the release agent into intimate contact with the mould surface by the force of projection of the mixture, whereby the solid particles and excess release agent may separate from the mould surface while leaving an intimate coating of the release agent thereon.

2. The method as defined in claim 1 wherein said release agent comprises di-methyl silicone and is present as a coating on said glass beads.

3. The method as defined in claim 1 wherein said glass beads are of a size to pass through a 250 micron sieve but at least half of the beads by weight are retained on a 100 micron sieve and will pass through a 200 micron sieve.

4. A mixture for simultaneously cleaning a mould surface and applying a mould release agent thereto, said mixture comprising a carrier liquid containing glass beads in an amount of approximately 2 lbs. per gallon of the carrier liquid and also containing a release agent selected from the group consisting of calcium, aluminum and zinc stearate and di-methyl silicone, the release agent being present in a concentration of between 1/8% and 1/2% by weight of the carrier liquid, and the glass beads being of a size to pass through a 250 micron sieve but at least half of the beads by weight are retained on a 100 micron sieve and will pass through a 200 micron sieve.

5. The mixture as defined in claim 4 wherein said release agent comprises di-methyl silicone and is present as a coating on said glass beads.

References Cited
UNITED STATES PATENTS

| | | | |
|---|---|---|---|
| 2,473,887 | 6/1949 | Jennings et al. | 117—5.3 |
| 2,586,211 | 2/1952 | Currie | 106—38.22 |
| 2,666,685 | 1/1954 | Hommel et al. | 106—38.22 |
| 2,811,408 | 10/1957 | Braley | 117—5.3 |
| 2,946,437 | 6/1960 | Edgecombe | 106—38.27 |
| 3,116,524 | 1/1964 | Royal | 117—5.3 |
| 3,126,294 | 3/1964 | Pichler | 106—38.27 |
| 3,220,070 | 11/1965 | Tajkowski | 106—38.27 |
| 3,262,830 | 7/1966 | Vincent | 117—126 X |
| 1,558,440 | 10/1925 | Weber | 106—28.24 |
| 2,287,270 | 6/1942 | Partridge | 106—38.24 |

JULIUS FROME, *Primary Examiner.*

L. B. HAYES, *Assistant Examiner.*

U.S. Cl. X.R.

106—266; 117—5.3